(12) United States Patent
Leichtle et al.

(10) Patent No.: US 11,627,707 B1
(45) Date of Patent: Apr. 18, 2023

(54) METHOD AND APPARATUS FOR HORTICULTURE

(71) Applicant: FlowaPowa GmbH, Zossen (DE)

(72) Inventors: Tobias Leichtle, Blankenfelde-Mahlow (DE); Tim Marvin Kochler, Berlin (DE)

(73) Assignee: FLOWAPOWA HOLDING UG, Berlin (DE)

( * ) Notice: Subject to any disclaimer, the term of this patent is extended or adjusted under 35 U.S.C. 154(b) by 0 days.

(21) Appl. No.: 17/537,983

(22) Filed: Nov. 30, 2021

(51) Int. Cl.
*A01G 9/24* (2006.01)
*F21V 29/76* (2015.01)
*F21V 29/61* (2015.01)
*F21W 131/40* (2006.01)

(52) U.S. Cl.
CPC .............. *A01G 9/249* (2019.05); *F21V 29/61* (2015.01); *F21V 29/767* (2015.01); *F21W 2131/40* (2013.01)

(58) Field of Classification Search
CPC .................... A01G 9/249; A01G 7/045; F21V 29/60–677
See application file for complete search history.

(56) References Cited

U.S. PATENT DOCUMENTS

| | | | |
|---|---|---|---|
| 3,104,307 A | 9/1963 | Garofalow et al. | |
| 2015/0198321 A1* | 7/2015 | Druchinin | F21V 29/56 362/294 |
| 2021/0116121 A1* | 4/2021 | Xu | F21K 9/275 |

FOREIGN PATENT DOCUMENTS

| | | |
|---|---|---|
| CN | 103416292 | 12/2013 |
| CN | 104456758 | 3/2015 |
| CN | 205351559 | 6/2016 |
| CN | 206247169 | 6/2017 |
| CN | 106989464 | 7/2017 |
| CN | 206320862 | 7/2017 |
| DE | 10129494 | 1/2003 |
| DE | 102017123565 | 10/2018 |
| EP | 3469887 | 12/2020 |

(Continued)

OTHER PUBLICATIONS

"Wie man sich eine Growbox selber bauen kann", Irierebel, Oct. 17, 2016. Retrieved Nov. 10, 2021 from https://www.irierebel.com/2016/10/17/eine-growbox-selber-bauen/.

(Continued)

*Primary Examiner* — Mariceli Santiago
(74) *Attorney, Agent, or Firm* — Carlson, Gaskey & Olds, P.C.

(57) ABSTRACT

An example horticulture device includes a housing. The housing includes a central cavity having an inlet and an outlet in fluid communication with the inlet through the central cavity. The horticulture device also includes at least one heat sink fixed relative to the housing. Each of the at least one heat sinks include a main body and a plurality of fins extending therefrom, a plurality of passages being provided between the fins of the at least one heat sink, between adjacent ones of the at least one heat sinks, or both. The horticulture device also includes at least one light source fixed relative to the at least one heat sink and in thermal contact with the at least one heat sink, and a fan disposed within the housing and configured to pass air through the plurality of passages and into the central cavity. A method is also disclosed.

23 Claims, 8 Drawing Sheets

(56) References Cited

FOREIGN PATENT DOCUMENTS

JP    2017083096    5/2017
WO   WO-2021033175 A1 *  2/2021  ............... A01G 9/16

OTHER PUBLICATIONS

"Funktionsweise einer modernen Indoor-Homegrow-Anlage (3)", Growmart, 2013. Retrieved Sep. 27, 2021 from https://www.growmart.de/indoor-homegrow-in-growbox-prinzip-seite-5-von-5.
"Hazelbox design growbox", 2022. Retrieved Sep. 20, 2022 from https://www.hazelbox.com/de/.

* cited by examiner

METHOD AND APPARATUS FOR HORTICULTURE

BACKGROUND

This application relates to horticulture, and more particularly to a method and apparatus for providing lighting and optionally air filtration for plants.

Although many plants can grow indoors using only natural sunlight, some growers choose to use electric grow lights to grow plants, such as cannabis, indoors. The use of grow lights enables growers to deliver desired amounts of light even in adverse weather conditions, and to increase yield of a plant if the plant is a crop. However, grow lights can generate high temperatures, and growing plants such as cannabis can cause strong odors, both of which may be undesirable for growers.

SUMMARY

A horticulture device according to an example embodiment of the present disclosure includes a housing. The housing includes a central cavity having an inlet and an outlet in fluid communication with the inlet through the central cavity. The horticulture device also includes at least one heat sink fixed relative to the housing. Each of the at least one heat sinks include a main body and a plurality of fins extending therefrom, a plurality of passages being provided between the fins of the at least one heat sink, between adjacent ones of the at least one heat sinks, or both. The horticulture device also includes at least one light source fixed relative to the at least one heat sink and in thermal contact with the at least one heat sink, and a fan disposed within the housing and configured to pass air through the plurality of passages and into the central cavity.

In a further embodiment of the foregoing embodiment, the horticulture device includes an air filter disposed in the central cavity between the inlet and the outlet. The fan is configured to pass the air through the air filter in the central cavity to the outlet.

In a further embodiment of any of the foregoing embodiments, the air filter is disposed fluidly upstream of the fan and fluidly downstream of the inlet and plurality of passages.

In a further embodiment of any of the foregoing embodiments, the at least one heat sink includes a plurality of openings that extend through the main body of the heat sink. The horticulture device includes a plurality of fasteners that extend through respective ones of the plurality of openings to bias the filter towards a support structure of the housing, and provide a seal between the filter and the housing.

In a further embodiment of any of the foregoing embodiments, the horticulture device includes a baffle disposed in the housing and configured to direct the air through the plurality of passages towards the central cavity.

In a further embodiment of any of the foregoing embodiments, the horticulture device includes a sensor configured to measure an attribute of the at least one heat sink, the central cavity, or an environment outside of the housing. The horticulture device also includes a controller configured to, in a first mode, adjust one or both of a rotational speed of the fan and a brightness of the at least one light source based on the attribute measured by the sensor.

In a further embodiment of any of the foregoing embodiments, the controller is configured to, in a second mode, operate the fan at a rotational speed that is within 15% of a maximum rotational speed of the fan, the rotational speed in the second mode not based on the attribute measured by the sensor.

In a further embodiment of any of the foregoing embodiments, the controller is configured to turn the at least one light source on and off according to a predefined schedule, and maintain the fan in an on state when the at least one light source is turned off.

In a further embodiment of any of the foregoing embodiments, the housing is a first housing, and the controller is at least partially disposed in a second housing that is separate from the first housing, a cable connecting the first housing to the second housing, the cable including at least one first wire for powering at least one light source.

In a further embodiment of any of the foregoing embodiments, the second housing includes an auxiliary power outlet configured to power an auxiliary device. The controller the controller is configured to turn on the auxiliary power outlet based on the at least one light source being turned on, and turn off the auxiliary outlet based on the at least one light source being turned off.

In a further embodiment of any of the foregoing embodiments, the cable also includes at least one data transmission wire that facilitates communication between the controller and the sensor.

A method according to an example embodiment of the present disclosure includes providing lighting for at least one plant from at least one light source that is fixed relative to and in thermal contact with at least one heat sink of a housing of a horticultural device. Each of the at least one heat sinks include a main body and a plurality of fins extending therefrom, a plurality of passages being provided between the fins of the at least one heat sink, between adjacent ones of the at least one heat sinks, or both. The housing includes a central cavity having an inlet and an outlet in fluid communication with each other through the central cavity. The method includes operating a fan disposed within the housing to pass air through the plurality of passages and into the central cavity.

In a further embodiment of the foregoing embodiment, the method includes providing air filtration by operating the fan to pass the air through an air filter in the central cavity to the outlet.

In a further embodiment of any of the foregoing embodiments, the method includes biasing the filter towards a support structure of the housing to form a seal between the filter and the housing. The biasing includes using a plurality of fasteners that extend through respective openings of the at least one heat sink.

In a further embodiment of any of the foregoing embodiments, the method includes turning the at least one light source on and off according to a predefined schedule, and maintaining the fan in an on state when the at least one light source is turned off.

In a further embodiment of any of the foregoing embodiments, the method includes utilizing a sensor to measure an attribute of the at least one heat sink, the central cavity, or an environment outside of the housing. The method also includes, in a first mode, adjusting one or both of a rotational speed of the fan and a brightness of the at least one light source based on the attribute measured by the sensor.

In a further embodiment of any of the foregoing embodiments, the method includes, in a second mode, operating the fan at a rotational speed that is within 15% of a maximum rotational speed of the fan, the rotational speed not based on the attribute measured by the sensor in the second mode.

In a further embodiment of any of the foregoing embodiments, the housing is a first housing. A controller that controls a rotational speed of the fan and whether power is delivered to the at least one light source is at least partially disposed in a second housing that is separate from the first housing. The method includes powering the at least one light source and the fan through at least one first wire in a cable that connects the first housing to the second housing. The method also includes communicating between the controller and the sensor through at least one second wire in the cable that is separate from the at least one first wire.

In a further embodiment example of any of the foregoing embodiments, the method includes powering an auxiliary device through an auxiliary power outlet of the second housing.

In a further embodiment of any of the foregoing embodiments, the method includes turning on power to the auxiliary outlet based on power to the at least one light source being turned on, and turning off power to the auxiliary outlet based on power to the at least one light source being turned off.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
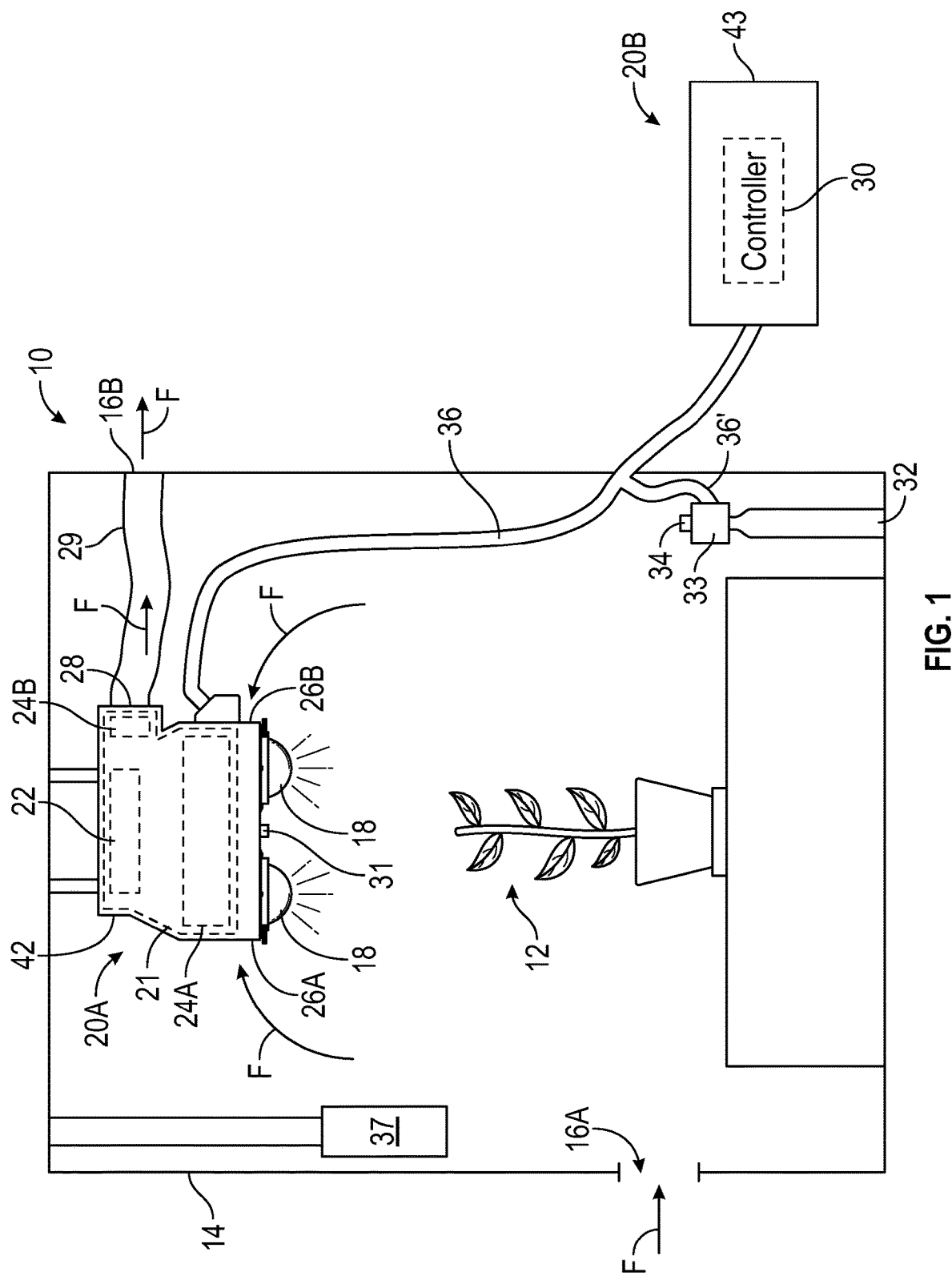
FIG. 1 schematically illustrates a horticulture system for providing lighting and optionally also air filtration for one or more plants, which includes a lighting and filtration unit (LFU), and a power and control unit (PCU).

FIG. 1 schematically illustrates a system 10 for providing lighting and optionally also air filtration for one or more plants 12. In the example of FIG. 1, a plant 12 is provided within an enclosure 14 (e.g., a grow tent) that includes an inlet 16A for receiving air into the enclosure 14, and an outlet 16B for air to exit the enclosure 14. A horticulture device 20 is provided that includes a lighting and filtration unit ("LFU") 20A and a power and control unit ("PCU") 20B that controls operation of the LFU 20A.

In the example of FIG. 1, the LFU 20A provides both lighting and air filtration for the plant 12. However, if desired, filtration functionality could be omitted from the LFU 20A. The LFU 20A includes a housing 42, and a least one light source 18 configured to provide lighting for the plant 12. The at least one light source 18 may include light-emitting diode (LED) lamps that utilize semiconductors, for example. In one example, the at least one light source 18 is configured to provide pulsed light to the plant 12, whereby the at least one light source 18 would be cycled on and off according to a pulse cycle (e.g., on the order of seconds). Performing pulsed lighting in some examples can provide an increased amount of photosynthesis per unit of light than would be achieved with continuous light, without the optical saturation which may occur under intense constant non-pulsed light. In one example, the at least one light source 18 is turned on and off according to a schedule (e.g., on the order of minutes or hours) and is either pulsed or non-pulsed during the on periods of the schedule.

In the example of FIG. 1, the LFU 20A also includes a central cavity 21, fan 22 disposed within the housing 42, a plurality of inlets 26A-B, and an outlet 28. The fan 22 is configured to facilitate a flow of air from the inlets 26A-B into the central cavity and to the outlet 28, where the air can then pass through a duct 29 to the outlet 16B of the enclosure 14.

A filter 24 may be provided to provide for air filtration within the enclosure 14, and reduce odors associated with the plant 12. The filter 24 may be provided, for example, within the central cavity 21, as shown with reference numeral 24A, or adjacent to the outlet 28 as shown with reference numeral 24B. It is understood, however that these are only example filter locations, and that other filter locations could be used. Also, as discussed, the filter 24 could be omitted from the housing 42 if desired.

The PCU 20B includes a housing 43 that is separate from the housing 42, and includes a controller 30 that controls operation of the at least one light source 18 and fan 22 based on feedback from one or more sensors 31. The sensor 31 may be a temperature sensor, humidity sensor, ozone sensor, or carbon dioxide sensor, for example. A cable 36 connects the housing 42 of the LFU 20A to the housing 43 of the PCU 20B, and the cable 36 includes at least one wire (not shown in FIG. 1) for powering the at least one light source 18. Optionally, the cable 36 uses the same or another wire to power the fan 22 and/or includes at least one data transmission wire that facilitates communication between the at least one sensor 31 and the controller 30. Although only a single sensor 31 is depicted in FIG. 1, it is understood that a plurality of sensors could be used (e.g., of the same type or of different types).

Although the LFU 20A and the PCU 20B are depicted as being separate from each other in FIG. 1, with the LFU 20A inside the enclosure 14, and the PCU 20B outside the enclosure, it is understood that this is a non-limiting embodiment, and that the LFU 20A and PCU 20B may be fully or partially combined into a single housing. In one example, a controller of the LFU 20A (discussed in greater detail below) is part of the housing 42, and a power supply portion of the LFU 20A (also discussed in greater detail below) remains in the housing 43.

A carbon dioxide tank 32 disposed in the enclosure 14 includes a valve 33 operable to control a discharge of carbon dioxide from the tank 32 through a tank outlet 34 into the enclosure 14. The valve 33 is operatively connected to the controller 30 (e.g., through a cable 36' that joins the cable 36), and is configured to be electronically actuated by the controller 30 to provide a desired level of carbon dioxide into the enclosure 14. This may include a pulsed discharge of carbon dioxide. Plants naturally reach a point of maximum growth rate at a certain level of illumination. If one increases the level of illumination beyond that point, the growth rate of the plant will decrease. However, by adding a certain amount carbon dioxide, that point can be moved towards greater growth rate through increased illumination.

An auxiliary device 37 may be provided in the enclosure if desired by a grower. Some example auxiliary devices 37 could include a fan to circulate air within the enclosure, additional sensors, a heating mat, an irrigation system, a humidifier, a dehumidifier, an ozone generator, and/or a nutrient water cooler. The auxiliary device 37 may also be powered by the PCU 20B.

Figure 2:
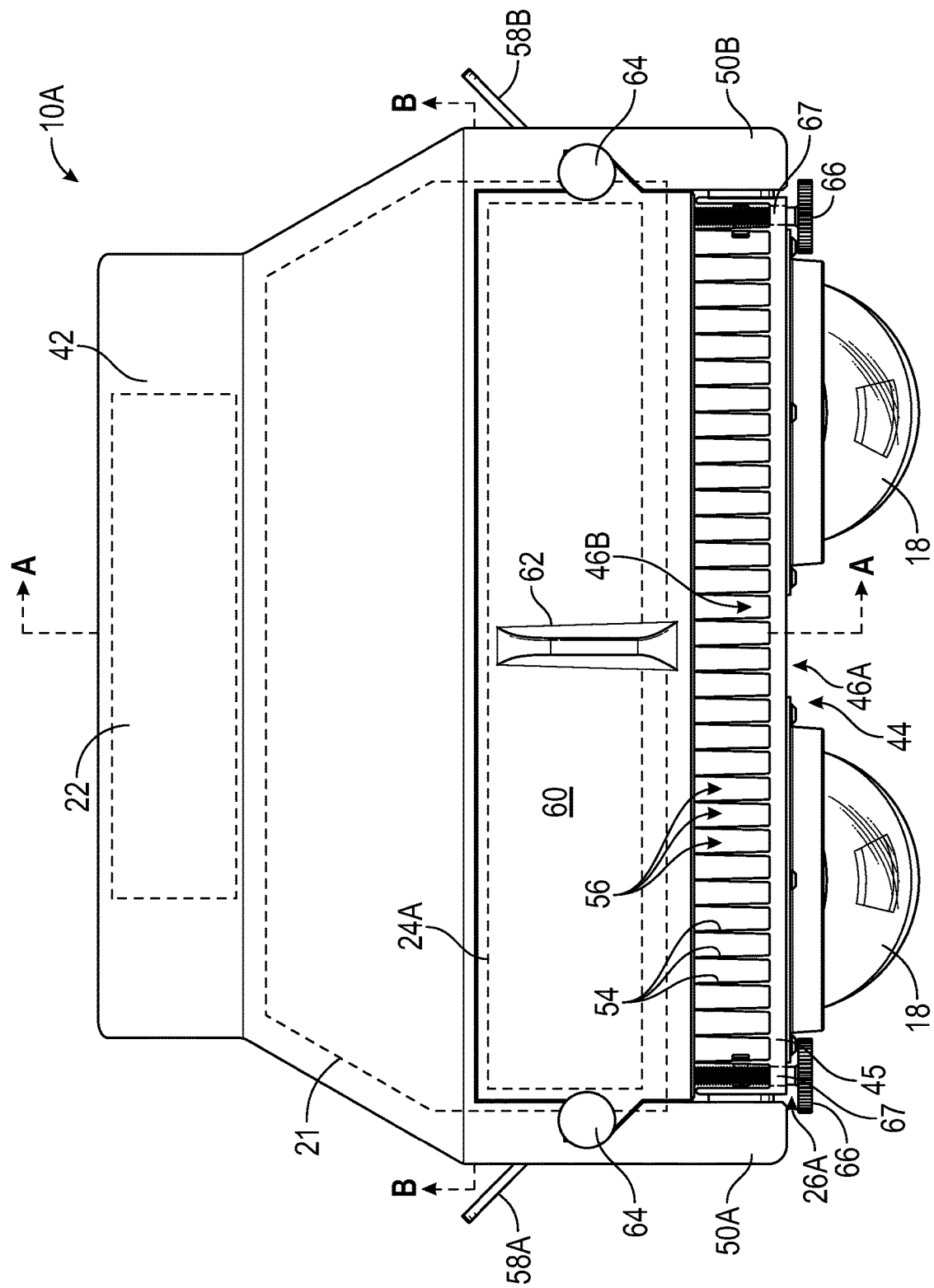
FIG. 2 schematically illustrates an enlarged view of an example of the LFU of FIG. 1.

FIG. 2 schematically illustrates an enlarged view of the LFU 20A of FIG. 1 according to one embodiment. The view of FIG. 2 depicts the left side of the LFU 20A as shown in FIG. 1, which includes the inlet 26A. As shown in FIG. 2, the LFU 20A includes the housing 42, which includes the central cavity 21. The LFU 20A also includes a heat sink 44 that is fixed relative to the housing 42. The heat sink 44 is fixed relative to the at least one light source 18, and is in thermal contact with the at least one light source 18. The heat sink 44 includes a main body 45 having an outer face 46A and an inner face 46B that is opposite the outer face 46A. A plurality of fins 54 extend from the main body 45, and the plurality of fins 54 define a plurality of passages 56 therebetween. In the example of FIG. 2, the plurality of fins 54 extend from the inner face 46B of the main body 45, and the light sources 18 are disposed on the outer face 46A of the main body 45.

The heat sink 44 and the central cavity 21 both extend between two opposing side walls 50A-B of the housing 42. The housing 42 includes a plurality of handles 58A-B for lifting and/or carrying the LFU 20A and/or for hanging the housing 42 in the enclosure 14.

A removable cover 60, which includes a handle 62, is provided for accessing the filter 24A. Fasteners 64 are provided for removably securing the removable cover 60 to the housing 42. Although the fasteners 64 are depicted as thumbscrews in the example of FIG. 2, it is understood that other types of fasteners 64 could be used.

The heat sink 44 includes a plurality of openings 67 that extend through the main body 45, and in particular between the faces 46A-B of the main body 45 of the heat sink 44. A plurality of fasteners 66 are also provided that extend through the respective openings 67 of the heat sink 44 to bias the filter 24A upwards away from the heat sink 44 and towards a support structure 72 of the housing 42 (see discussion of FIG. 4 below), to thereby form a seal between the filter 24A and the housing 42. Although the fasteners 66 are depicted as thumbscrews in the example of FIG. 2, it is understood that other types of fasteners 64 could be used.

Figure 3A:
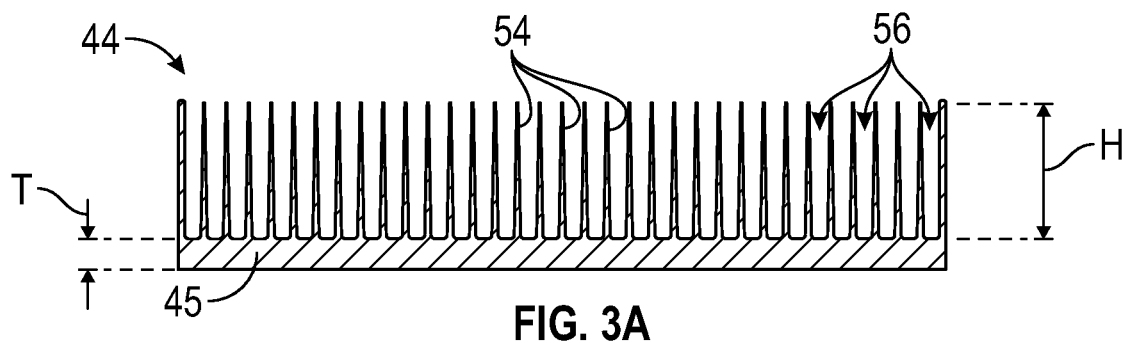
FIG. 3A schematically illustrates a side view of a heat sink of FIG. 1.

FIG. 3A schematically illustrates an enlarged view of the heat sink 44 of FIG. 2. As shown in FIG. 3A, the fins 54 of the heat sink 44 have a height H, and the main body 45 of the heat sink 44 has a thickness T.

Figure 3B:
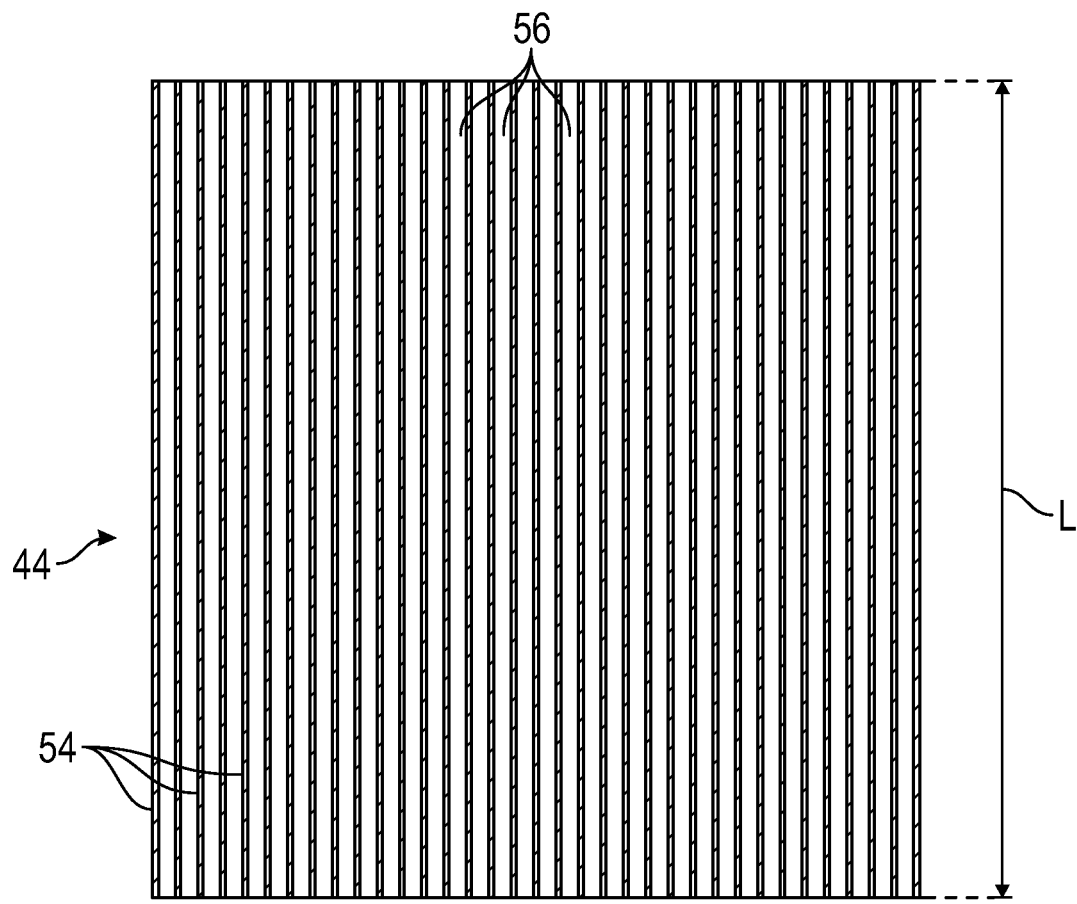
FIG. 3B schematically illustrates a top side view of the heat sink of FIG. 3A.

FIG. 3B illustrates a top view of the heat sink. As shown in FIG. 3B, the fins 54 and passages 56 have a length L.

In one example, a ratio of L/H is 3-25. In a further example, a ratio of UH is 5-18. In a further example, a ratio of L/H is 8-12.

In one example, a ratio of L/T is 10-125. In a further example, a ratio of L/T is 25-90. In a further example, a ratio of L/T is 40-60.

In this disclosure, like reference numerals designate like elements where appropriate and reference numerals with the addition of one-hundred or multiples thereof designate modified elements that are understood to incorporate the same features and benefits of the corresponding elements.

Figure 3C:
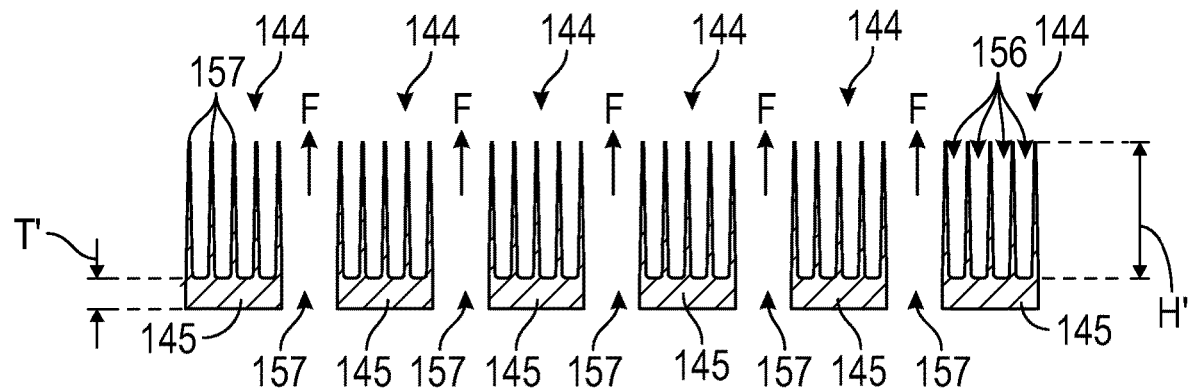
FIG. 3C schematically illustrates a side view a set of heat sinks that may be used in place of the heat sink of FIG. 1.

FIG. 3C schematically illustrates a side view of a set of heat sinks 144 that may be used in place of the heat sink 44 of FIG. 2. The heat sinks 144 each include a main body 145, and fins 154 that extend therefrom. First passages 156 are provided between the individual fins 154, and additional passages 157 are provided between adjacent ones of the heat sinks 144.

As shown in FIG. 3C, the fins 154 of each heat sink 144 have a height H', and the main body 145 of ach heat sink 144 has a thickness T'.

Figure 3D:
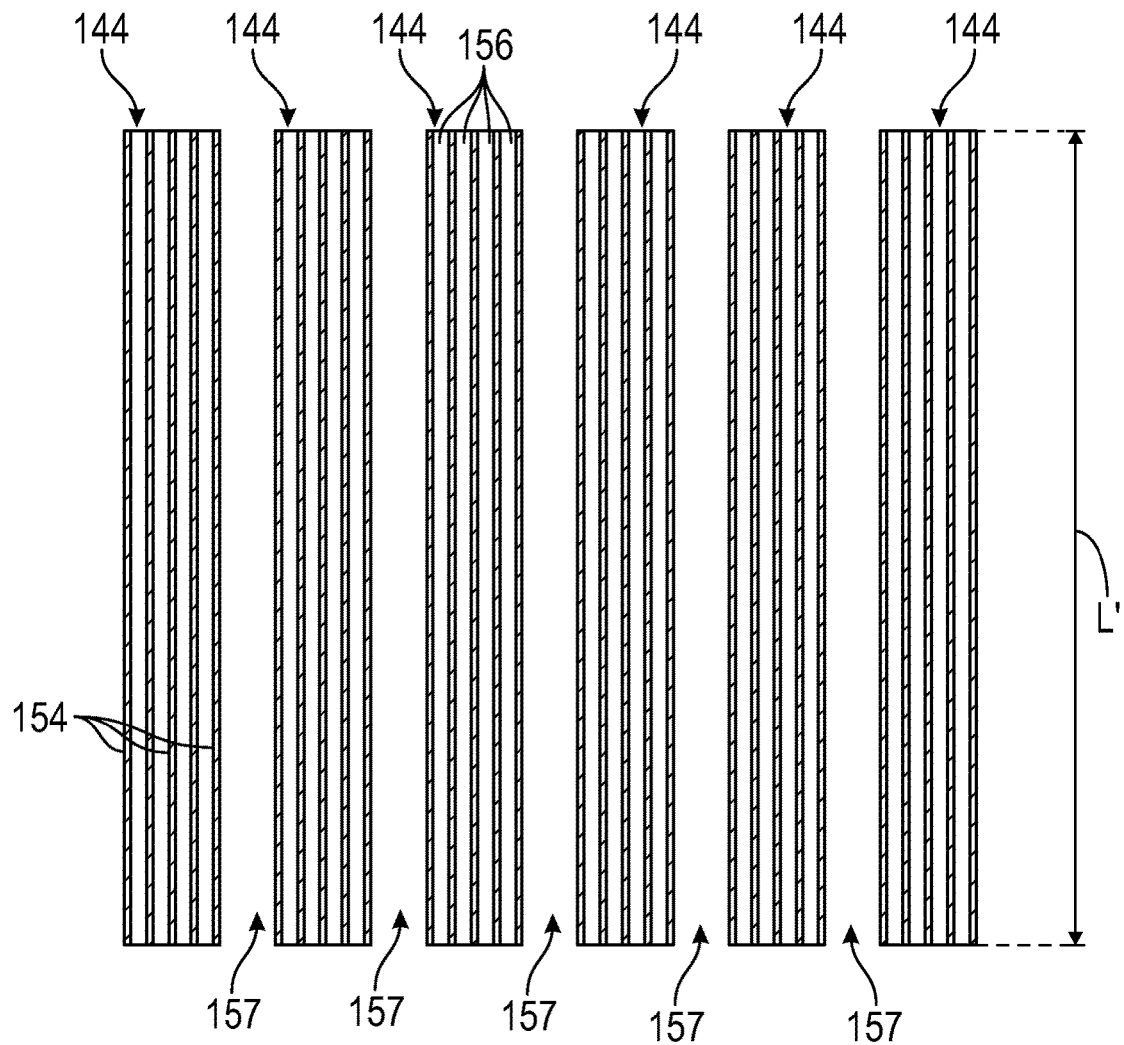
FIG. 3D schematically illustrates a top side view of the set of heat sinks of FIG. 3C.

Although six heat sinks 144 are shown in the set of FIGS. 3C-D, it is understood that other quantities of heat sinks 144 could be used.

FIG. 3D schematically illustrates a top side view of the set of heat sinks of FIG. 3C. As shown in FIG. 3D, the fins 154 and passages 156 have a length L', and the passages 157 are provided between adjacent ones of the heat sinks 144. In one example, the same ratios that are discussed above in relation to T, H, and L also apply to T', H', and L'.

Figure 4:
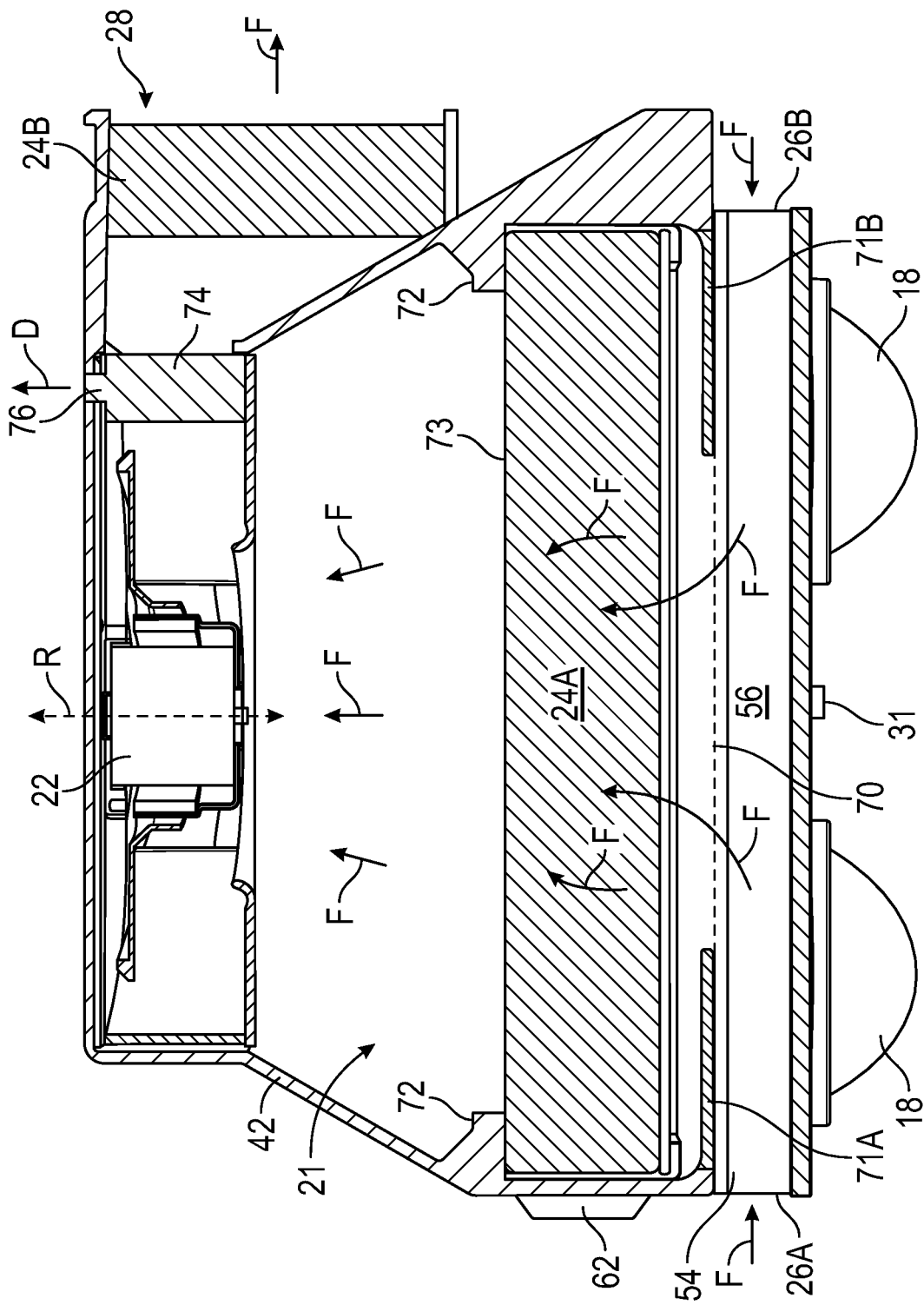
FIG. 4 schematically illustrates a cross-sectional view of the LFU of FIG. 1 taken along cross section A-A of FIG. 2.

FIG. 4 illustrates a cross-sectional view of the LFU 20A taken along cross section A-A of FIG. 2. In the example of FIG. 4, inlets 26A-B are provided on opposing sides of the housing 42. The central cavity 21 has an inlet 70 that is provided between two baffles 71A-B. The outlet 28 of the central cavity 21 is in fluid communication with the inlet 70 through the central cavity.

The fan 22 rotates about axis R to draw air through the inlets 26A-B of the housing 42 and through the passages 56 (one of which is shown in FIG. 4) and then through the inlet 70 of the central cavity 21. By passing air through the passages 56 and/or 156/157 into the central cavity 21, the fan is able to facilitate convective cooling of the heat sink 44/154.

The baffles 71A-B are disposed in the housing 42 and are configured to direct air through the plurality of passages 56 towards the central cavity 21. A support structure 72 of the housing 42 is provided. The filter 24A abuts the support structure 72 to form a seal between the filter 24A and the housing 42. As discussed above in connection with FIG. 2, the fasteners 67 may be used to bias the filter 24A towards the support structure 72 to form the seal.

As discussed above in connection with FIG. 1, the air filter 24A and/or 24B can be used to provide air filtration, or the air filters 24A-B can be omitted if air filtration is not desired within the housing 42. In either location, the air filter 24 is disposed in the central cavity 21 between the inlet 70 and the outlet 28, and the fan 22 is configured to pass air through the air filter 24 in the central cavity 21 to the outlet 28. In the example of air filter 24A, the filter is disposed fluidly upstream of the fan 22 and fluidly downstream of the inlet 70 and plurality of passages 56. In the example of air filter 24B, the filter is disposed fluidly downstream of the fan 22 and fluidly upstream of the outlet 28.

Optionally, a valve 74 may be provided within the enclosure 14 and fluidly downstream of the fan 22 for selectively diverting air from the outlet 16B of the enclosure 14, so that at least a portion of the airflow F could be recirculated within the enclosure 14. The valve 74 includes an outlet 76 through which air can be diverted, as shown with diverted airflow D, and the valve is controllable by the controller 30. Although the valve 76 is depicted as being part of the housing 42, it is understood that the valve could be separate from the housing 42 and located in the duct 29, for example.

Figure 5:
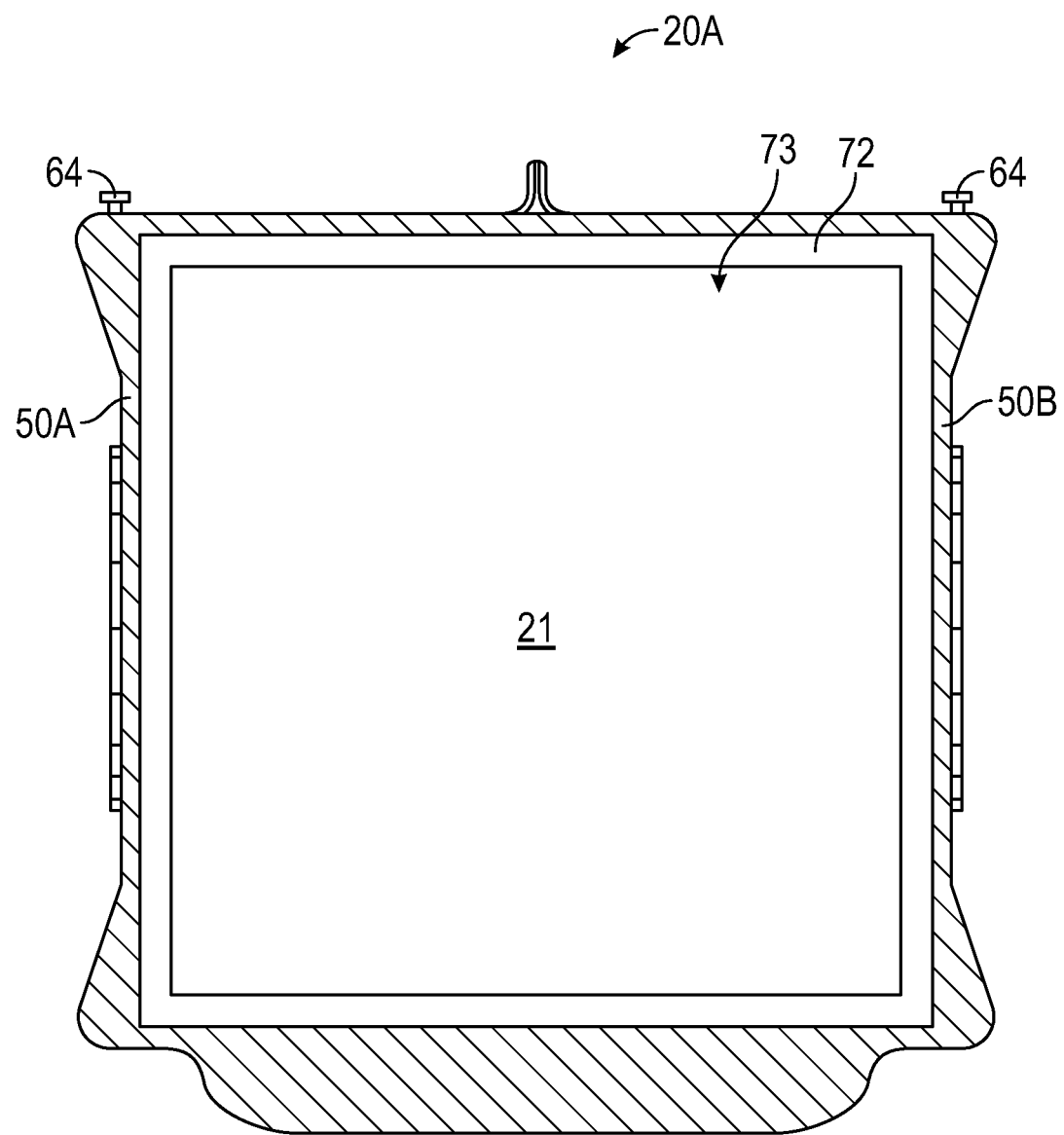
FIG. 5 schematically illustrates a cross-sectional view of the LFU of FIG. 1 taken along cross section B-B of FIG. 2.

FIG. 5 schematically illustrates a cross-sectional view of the LFU 20A of FIG. 1 taken along cross section B-B of FIG.

2. As shown in FIG. 5, the support structure 72 extends between the opposing sidewalls 50A-B, and includes the inlet 73 that defines a portion of the central cavity 21. As discussed above, the filter 24A abuts the support structure 72 to form a seal between the filter 24A and the housing 42.

Figure 6:
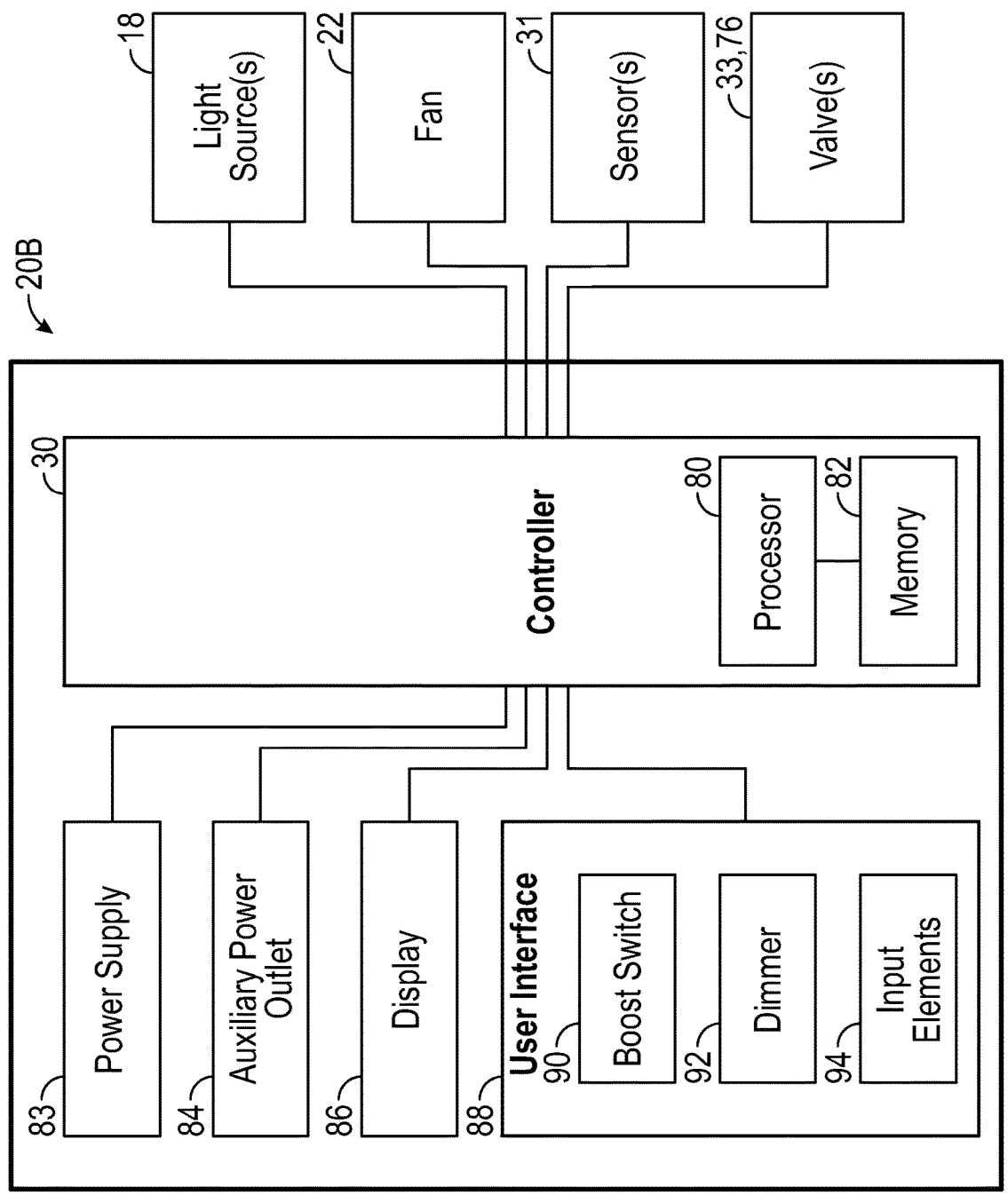
FIG. 6 schematically illustrates an example of the PCU of FIG. 1.

FIG. 6 schematically illustrates an example of the PCU 20B of FIG. 1. The PCU 20B includes the controller 30 shown in FIG. 1. The controller 30 includes a processor 80 operatively connected to memory 82. The processor 80 may include one or more microprocessors, microcontrollers, application specific integrated circuits (ASICs), or the like, for example.

The memory 82 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 82 may incorporate electronic, magnetic, optical, and/or other types of storage media. The memory 82 can also have a distributed architecture, where various components are situated remotely from one another, but can be accessed by the processor 80.

In the example of FIG. 6, the controller 30 is operatively connected to a power supply 83, an auxiliary power outlet 84, a display 86, a user interface 88, the light source(s) 18, the fan 22, the sensor(s) 31, and the valves 33 and/or 76.

The power supply 83 provides power to the PCU 20B and the controller 30 controls whether power from the power supply 83 is provided to one or more of the light source(s) 18, the fan 22, the sensor(s) 31, and the valves 33 and/or 76. In one example, the power supply 83 includes an energy storage device, such as a battery. In the same or another example, the PCU 20B receives AC power from an external power source and performs an AC/DC conversion to power its load.

The user interface 88 enables a user to configure the controller 30, e.g., to control an intensity of the at least one light source 18 and/or a rotational speed of the fan 22 according to a predefined schedule. The user interface 88 may include a dimmer element 92 (e.g., a dial or slider) for adjusting a brightness of the light source(s) 18. In one example, the controller 30 utilizes pulse-width modulation to provide for brightness adjustments of the light sources(s) 18. The input elements 94 may include buttons, for example, for configuring a lighting and/or fan speed schedule.

The auxiliary power outlet 84 is configured to power the auxiliary device 37, such as an additional fan within the enclosure (not shown) that is separate from the LFU 20A and circulates air within the enclosure 14. In one example, the controller 30 is configured to turn on the auxiliary power outlet 84 based on the at least one light source 18 being turned on, and turn off the auxiliary outlet 84 based on the at least one light source 18 being turned off. In one example, the controller 30 is configured to turn on the auxiliary power outlet 84 based on a predefined schedule. In one example, the controller 30 is configured to turn on the auxiliary power outlet 84 based on feedback from the sensor(s). In a further example, the controller 30 is configured to control the auxiliary power outlet 84 independently of the at least one light source 18 (e.g., so that the auxiliary power outlet 84 remains on regardless of whether the at least one light source 18 is on).

In one example, the controller 30 controls the light sources 18 and/or fan 22 based on feedback from the sensor(s) 31. Each sensor 31 measures an attribute of the heat sink 44, the central cavity, or an environment outside of the housing 42 (e.g., but within the enclosure 14), and the controller 30 compares the measured attribute to a predefined temperature threshold to determine if action should be taken. Although an example location for the sensor 31 is shown in FIG. 1, it is understood that other sensor locations could be used (e.g., other positions on or in the housing 42 or separate from the housing 42 in the enclosure 14, such as on or in close proximity to the plant 12).

In one example, a temperature sensor 31 is provided, and if the measured temperature from the temperature sensor 31 exceeds a predefined temperature threshold, then the controller 30 decreases the intensity of the at least one light source 18 to reduce heat generated by the at least one light source 18 and/or increases a rotational speed of the fan 22 to increase airflow through the passages 56 of the heats sink 44, and thereby increase convective cooling of the heat sink 44, 154.

Another example type of sensor 31 that may be used is a carbon dioxide sensor configured to measure a carbon dioxide level within the enclosure 14 and/or within the central cavity 21. In one such example, the controller 30 receives a carbon dioxide measurement from the sensor 31, and compares it to a predefined threshold. If the carbon dioxide level is below the threshold, the controller 30 actuates the valve 33 to release carbon dioxide from tank 32 and through outlet 34 into the enclosure 14.

Another example type of sensor 31 that may be used is a humidity sensor configured to measure a humidity level within the enclosure 14 and/or within the central cavity 21. In one such example, the controller 30 receives a humidity measurement from the sensor 31, and compares it to a predefined threshold. If the humidity is above the threshold, the controller 32 increases a rotational speed of the fan 22 to move moist air that is within the enclosure 14 to the outside of the enclosure 14 and controls the valve 74 so that all or a majority of the air exiting the LFU 20A is not recirculated within the enclosure 14, and thereby reduces the humidity within the enclosure 14.

Another example type of sensor 31 that may be used is an ozone sensor configured to measure an ozone level within the enclosure 14 and/or within the central cavity 21. In one such example, the controller 30 receives an ozone measurement from the sensor 31, and compares it to a predefined ozone threshold. In one such example, if the ozone level is below the ozone threshold, the controller 30 turns on the auxiliary power outlet 84 (e.g., to power an ozone generator to provide ozone within the enclosure 14).

Although only a single sensor 31 is depicted in FIG. 1, it is understood that a plurality of sensors 31 could be used (e.g., of the same type or of different types). In one example, if multiple sensors 31 of the same type are used (e.g., multiple temperature sensors), the measurements from the sensors 31 are combined by the controller 30 (e.g., averaged and/or weighted) to determine a single value to use for comparison to a threshold.

Referring again to FIG. 1, with continued reference to FIG. 5, the sensor 31 is configured to measure an attribute of the heat sink 44, the central cavity 21, or an environment outside of the housing 42. In one example, the controller 30 is configured to, in a first mode, adjust one or more of a brightness of the light source(s) 18, a rotational speed of the fan 22, and a position of the valves 33 and/or 76 based on the attribute measured by the sensor 31. In one example, the controller 30 includes a second mode in which the controller operates the fan 22 at a rotational speed (e.g., a constant rotational speed) that is within 15% of a maximum rotational speed of the fan 22, and is not based on the attribute measured by the at least one sensor 31. In one example, the controller 30 enters the second mode based on actuation of the boost switch 90 regardless of the measurements of the sensor 31. Thus, if the controller 30 is rotating the fan 22 at 70% of its maximum rotational speed, actuation of the boost switch 90 could cause the rotational speed of the fan 22 to increase to 85%-100% of its maximum rotational speed.

In one example, the controller 30 is configured to turn the at least one light source 18 on and off according to a predefined schedule stored in the memory 82. In the same or another example, the controller 30 is configured to maintain the fan 22 in an on state when the at least one light source 18 is turned off, so that the LFU 20A still provides air filtration even when the at least one light source 18 is turned off.

Figure 7:
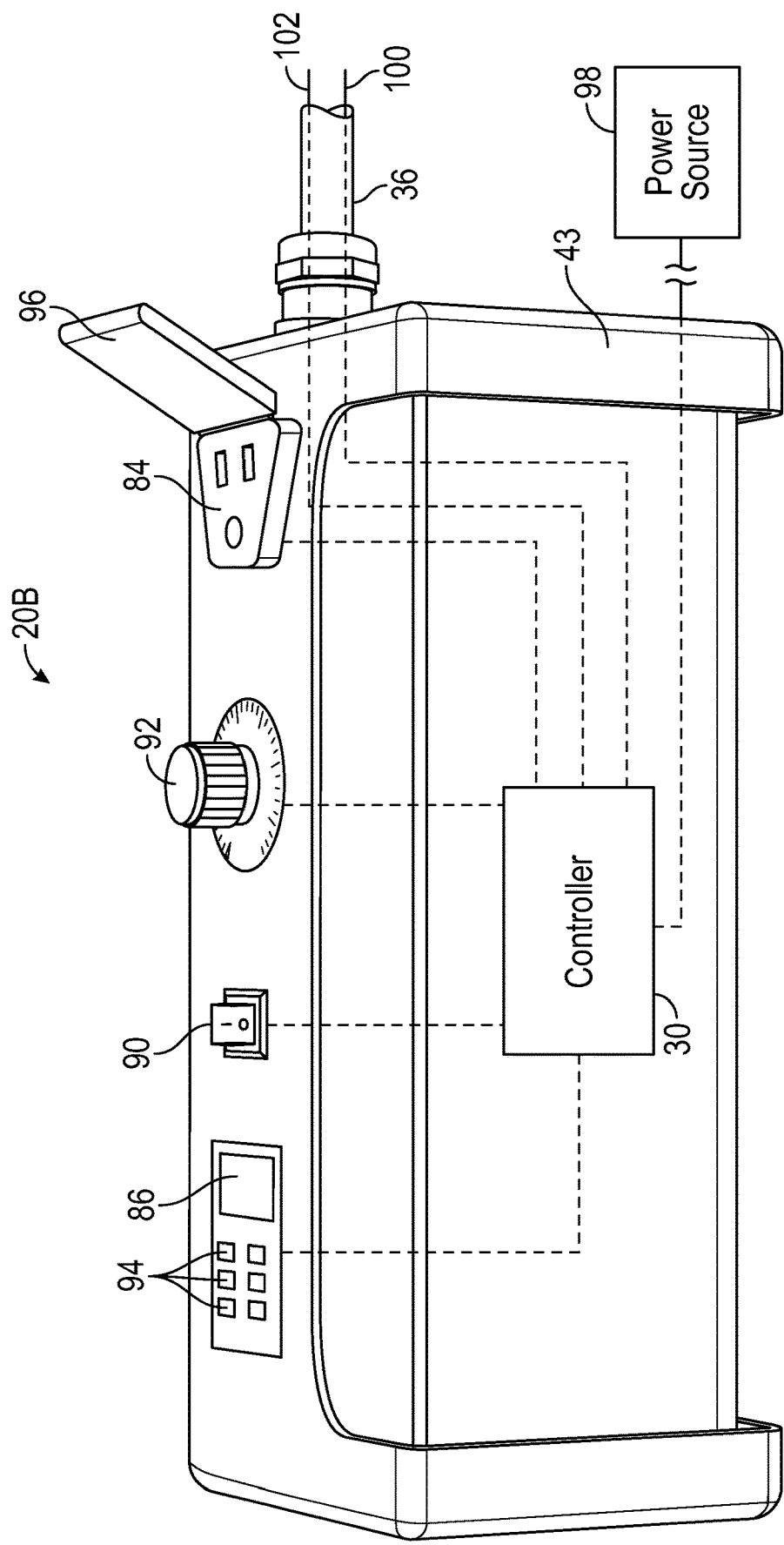
FIG. 7 schematically illustrates an example of a housing for the PCU of FIG. 1.

FIG. 7 schematically illustrates an example of the housing 43 for the PCU 20B of FIG. 6. In the example of FIG. 7, the dimmer 92 is a dial, and the input elements 94 include a plurality of buttons for programming a lighting schedule of the LFU 20A. A hinged cover 96 is provided for covering and providing access to the auxiliary power outlet 84.

In the non-limiting example of FIG. 7, the cable 36 includes at least one power wire 100 for powering these components, and the cable 36 also includes at least one data transmission wire 102 for communicating with the sensor(s) 31. However, it is understood that other wiring configurations could be used (e.g., separate wires not within a shared cable 36 and/or wireless communication between the controller 30 and sensor(s (31).

The system 10 discussed above provides some notable improvements over the prior art. In the example of FIG. 1, where the LFU 20A and PCU 20B are provided separately, a grower may control and configure their lighting and/or air filtration without having to open their grow enclosure 14. Also, by including air filtration in the enclosure 14, excessive noise from an external filtration unit can be avoided if desired.

By sucking in heated air in close proximity of the one or more light sources 18, which act as a light and a heat source, the undesired heating of the inside of the enclosure 14 is prevented and it is easier to maintain a stable thermal household. Furthermore, the relative humidity of the unfiltered air as it passes through the inlet 73 is reduced, increasing the downstream filtration effectivity of the activated carbon filter 24A. By combining illumination and filtration within one housing 42, the user has an easy job setting up the device 20, having to hang only one device 20 into the enclosure 14.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A horticulture device, comprising:
a housing including a central cavity having an inlet and an outlet in fluid communication with the inlet through the central cavity;
at least one heat sink fixed relative to the housing and disposed outside of the central cavity, each of the at least one heat sinks including a main body and a plurality of fins extending therefrom, a plurality of passages being provided between the fins of the at least one heat sink, between adjacent ones of the at least one heat sinks, or both;
at least one light source fixed relative to the at least one heat sink and in thermal contact with the at least one heat sink; and
a fan disposed within the housing and configured to draw air through the plurality of passages and then through the inlet into the central cavity.

2. The horticulture device of claim 1, comprising:
an air filter disposed in the central cavity between the inlet and the outlet;
wherein the fan is configured to pass the air through the air filter in the central cavity and then through the outlet; and
wherein within the central cavity, the air filter is disposed fluidly upstream of the fan and fluidly downstream of the inlet.

3. The horticulture device of claim 2, wherein between the air filter and the fan, the central cavity tapers inwards towards the fan.

4. The horticulture device of claim 2, wherein:
the at least one heat sink includes a plurality of openings that extend through the main body of the heat sink; and
the horticulture device includes a plurality of fasteners that extend through respective ones of the plurality of openings to bias the filter towards a support structure of the housing, and provide a seal between the filter and the support structure.

5. The horticulture device of claim 2, comprising:
a baffle disposed in the housing and configured to direct the air through the plurality of passages towards the central cavity.

6. The horticulture device of claim 1, comprising:
a sensor configured to measure an attribute of the at least one heat sink, the central cavity, or an environment outside of the housing; and
a controller configured to, in a first mode, adjust one or both of a rotational speed of the fan and a brightness of the at least one light source based on the attribute measured by the sensor.

7. The horticulture device of claim 6, wherein the controller is configured to, in a second mode, operate the fan at a rotational speed that is within 15% of a maximum rotational speed of the fan, the rotational speed not based on the attribute measured by the sensor in the second mode.

8. The horticulture device of claim 6, wherein the controller is configured to turn the at least one light source on and off according to a predefined schedule, and maintain the fan in an on state when the at least one light source is turned off.

9. The horticulture device of claim 6, wherein the housing is a first housing, and the controller is at least partially disposed in a second housing that is separate from the first housing, a cable connecting the first housing to the second housing, the cable including at least one first wire for powering the at least one light source.

10. The horticulture device of claim 9, wherein:
the second housing includes an auxiliary power outlet configured to power an auxiliary device; and
the controller is configured to turn on the auxiliary power outlet based on the at least one light source being turned on, and turn off the auxiliary outlet based on the at least one light source being turned off.

11. The horticulture device of claim 9, wherein the cable also includes at least one data transmission wire that facilitates communication between the controller and the sensor.

12. The horticulture device of claim 1, wherein the fan is disposed within the central cavity.

13. A method, comprising:
providing lighting for at least one plant from at least one light source that is fixed relative to and in thermal contact with at least one heat sink of a housing of a horticultural device, each of the at least one heat sinks including a main body and a plurality of fins extending therefrom, a plurality of passages being provided between the fins of the at least one heat sink, between adjacent ones of the at least one heat sinks, or both, the housing including a central cavity having an inlet and an outlet in fluid communication with each other through the central cavity, the at least one heat sink disposed outside of the central cavity; and operating a fan disposed within the housing to draw air through the plurality of passages and then through the inlet into the central cavity.

14. The method of claim 13, comprising:

providing air filtration by operating the fan to pass the air through an air filter in the central cavity to the outlet;

wherein within the central cavity, the air filter is disposed fluidly upstream of the fan and fluidly downstream form the inlet.

15. The method of claim 14, comprising:

biasing the filter towards a support structure of the housing to form a seal between the filter and the housing, said biasing comprising using a plurality of fasteners that extend through respective openings of the at least one heat sink.

16. The method of claim 14, wherein between the air filter and the fan, the central cavity tapers inwards towards the fan.

17. The method of claim 13, comprising:

turning the at least one light source on and off according to a predefined schedule; and maintaining the fan in an on state when the at least one light source is turned off.

18. The method of claim 13, comprising:

utilizing a sensor to measure an attribute of the at least one heat sink, the central cavity, or an environment outside of the housing; and in a first mode, adjusting one or both of a rotational speed of the fan and a brightness of the at least one light source based on the attribute measured by the sensor.

19. The method of claim 18, comprising:

in a second mode, operating the fan at a rotational speed that is within 15% of a maximum rotational speed of the fan, the rotational speed not based on the attribute measured by the sensor in the second mode.

20. The method of claim 18, wherein the housing is a first housing, and a controller that controls a rotational speed of the fan and whether power is delivered to the at least one light source is at least partially disposed in a second housing that is separate from the first housing, the method comprising:

powering the at least one light source and the fan through at least one first wire in a cable that connects the first housing to the second housing; and communicating between the controller and the sensor through at least one second wire in the cable that is separate from the at least one first wire.

21. The method of claim 20, comprising:

powering an auxiliary device through an auxiliary power outlet of the second housing.

22. The method of claim 21, comprising:

turning on power to the auxiliary outlet based on power to the at least one light source being turned on; and turning off power to the auxiliary outlet based on power to the at least one light source being turned off.

23. The method of claim 13, wherein the fan is disposed within the central cavity.

* * * * *